Feb. 14, 1956     T. K. PETERSEN     2,734,645
CARGO HOIST MECHANISM

Filed Aug. 1, 1951     2 Sheets-Sheet 1

INVENTOR.
THORVALD K. PETERSEN
BY
Edwin Coates
ATTORNEY.

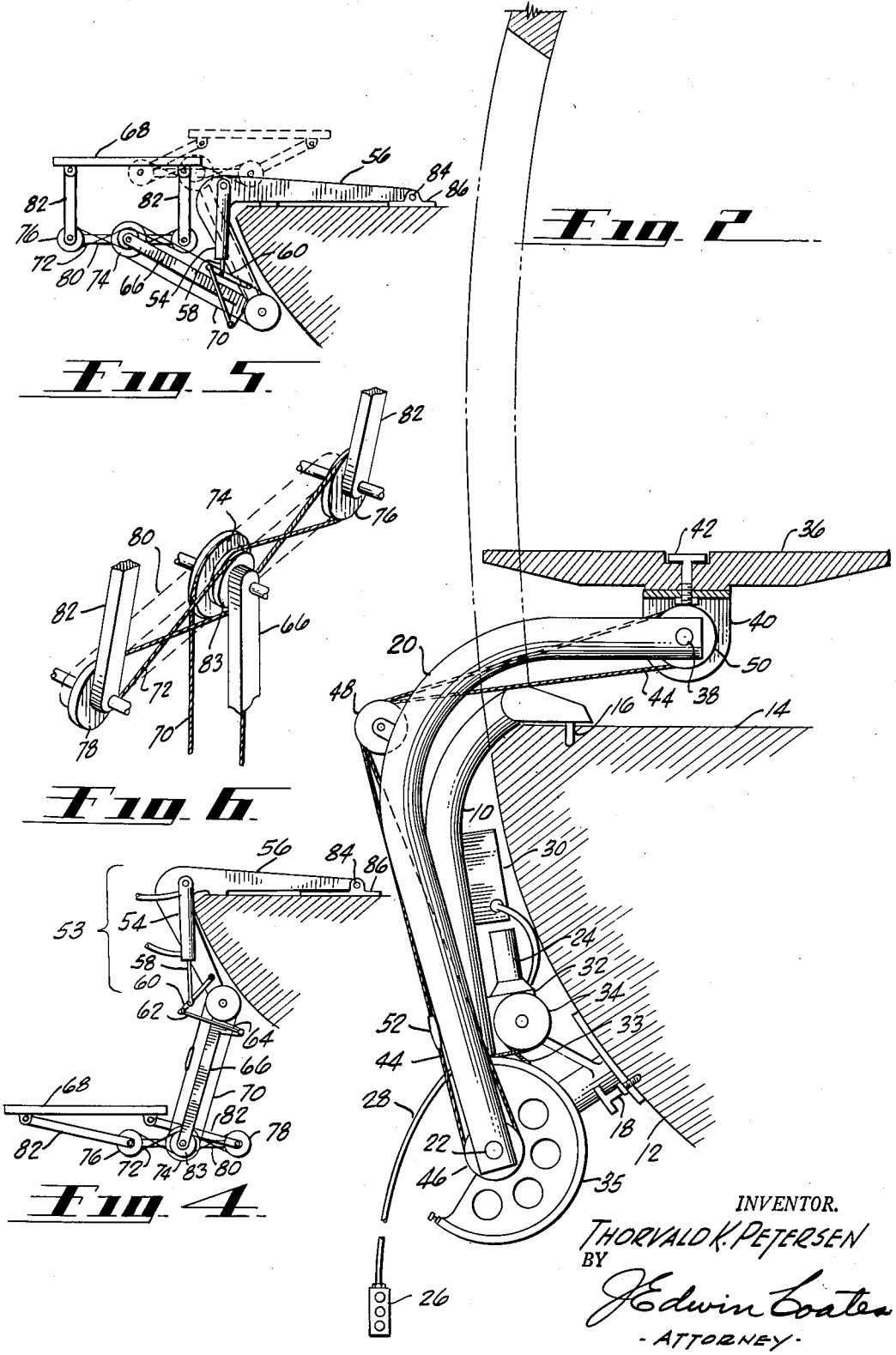

United States Patent Office 2,734,645
Patented Feb. 14, 1956

2,734,645

CARGO HOIST MECHANISM

Thorvald K. Petersen, Santa Monica, Calif., assignor to Douglas Aircraft Company, Inc., Santa Monica, Calif.

Application August 1, 1951, Serial No. 239,768

6 Claims. (Cl. 214—77)

This invention relates to apparatus for handling cargo and more particularly to an aircraft cargo hoist which is readily stowable, light in weight and readily traversable to convenient loading and unloading positions overlying the airport loading zone and the cargo floor of the aircraft.

As the size of cargo and passenger aircraft has increased, the height of the cargo doorway above the ground has progressively increased, partly because larger fuselages are spaced higher above the ground and partly because modern tricycle landing gears have raised the rear portions of the fuselages where the main cargo doorways are normally located. These two factors have combined to greatly increase the time required to load cargo on large military or commercial transports and cargo planes.

In the past it has been customary to wheel large ramps or vehicle mounted hoists into position in order to permit transfer of cargo from the airplane to the ground or to other cargo handling facilities such as baggage carts, trucks or the like. The ramps are necessarily heavy, cumbersome and expensive. Moreover, such ramps are rarely suitable for all variety of aircraft types which present this loading problem. The vehicle mounted hoist is likewise cumbersome and expensive and often not adaptable to the needs of all aircraft.

The present invention provides a compact, efficient hoist which may be mounted on a vehicle or carried within the airplane. When carried within the airplane its design may be such that it is particularly suited for use with the particular type of airplane involved. However, the basic features are such that the hoist mechanism, when operated from a vehicle or any temporary or permanent positioning means, will function to facilitate loading of any of the cargo and passenger type aircraft utilized by the government or the airlines.

The aircraft cargo hoist mechanism of the present invention basically is comprised of a support frame which is preferably secured to the aircraft or other cargo vehicles in a manner that locates one of its ends between the upper cargo receiving level of the airplane and the lower cargo receiving level which normally will be the surface of the airport. Lever means are pivotally mounted on the properly positioned end of said support frame and an electric motor or some similar actuating device is preferably mounted on the frame to serve as a means to rotate the lever. A cargo carrier such as a platform is pivotally mounted on the other end of the lever means. The carrier is held parallel to a predetermined plane, which is normally horizontal, regardless of the angular positions through which the lever is moved in handling cargo placed on the carrier. The continuous positioning of the carrier may be achieved by such expedients as cable and drum mechanisms, gearing arrangements, linkages or combinations thereof which relate the rotation of the carrier on the lever to the rotation of the lever relative to its fixed support.

In operation the carrier can be lowered to any chosen position parallel to the ground which is most convenient for cargo loading or unloading purposes. Likewise it may be elevated to a position sufficiently above the upper cargo floor to provide for convenient loading or unloading with a minimum of physical effort. In its preferred form the cargo carrier may actually enter the interior of the cargo carrier before being stopped at knee height for convenient use in cargo handling operations.

The hoist mechanism is particularly suited for use as a litter lift and may conveniently be provided with a carrier which will receive one or more litters. The patients would at all times be held in a horizontal position and may be positioned at knee-height for convenient loading or unloading within the interior of the evacuation airplane involved. By slight modification or replacement of the carrier the hoist mechanism can handle all sorts of cargo, its capacity being limited only by the nature and configuration of the materials used in its fabrication.

Other objects and advantages will be apparent from the following description taken in connection with the accompanying drawings, in which:

Figure 3 is a perspective view of the apparatus in its unmounted and stowed position;

Figure 4 is a side elevation partly in section showing another form of the hoist mechanism in which hydraulic actuation is used in conjunction with a parallelogram linkage system for positioning the carrier;

Figure 5 is a side elevation partly in section illustrating the hoist mechanism of Figure 4 in an intermediate position in full lines and in its upper position in dotted lines; and Figure 6 is a fragmentary perspective view depicting one form of a portion of the means for rotating the carrier to hold it constantly parallel to a predetermined plane.

Figure 1:
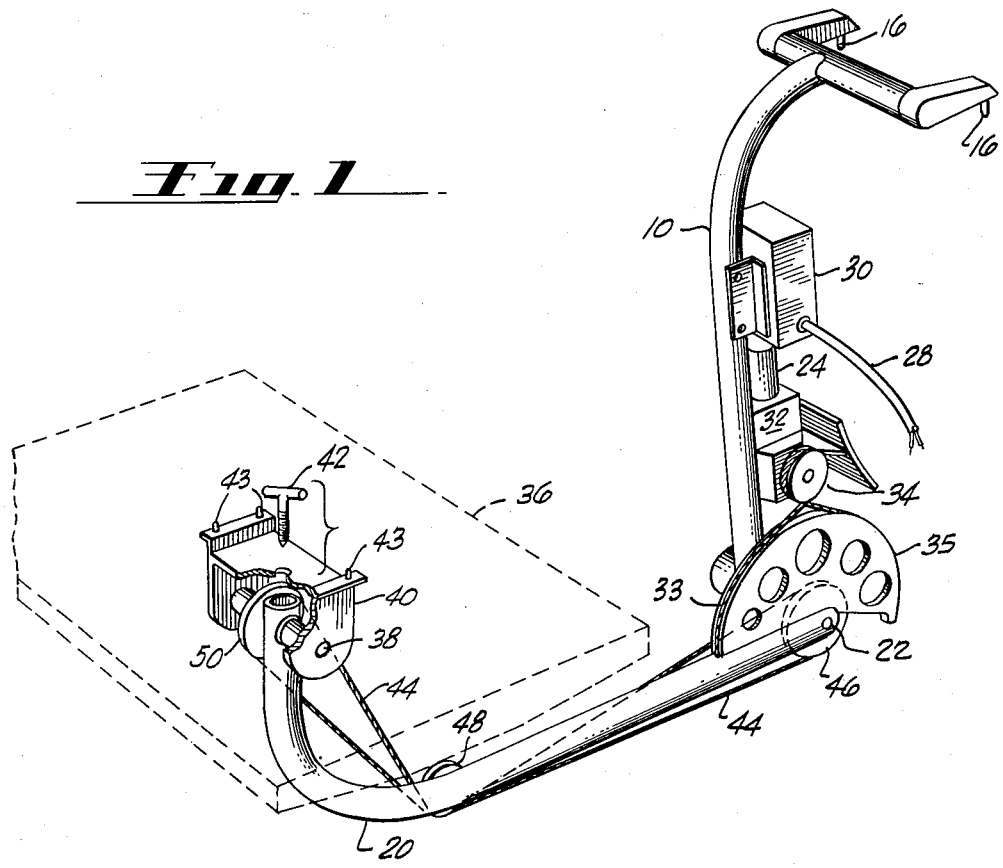
Figure 1 is a fragmentary perspective view of the mechanism with the cargo carrier shown partly in dotted lines to illustrate more clearly the operation and construction of the apparatus.
Figure 2:
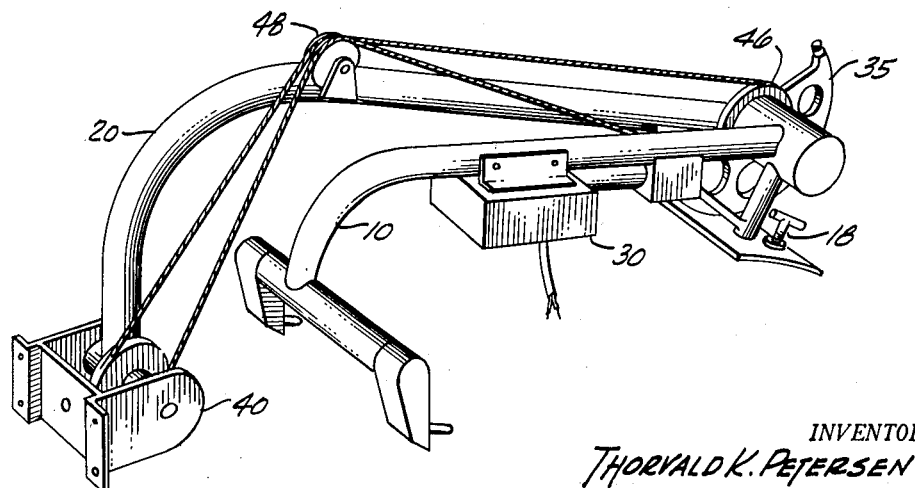
Figure 2 is a side elevation partly in section depicting the hoist mechanism in a form adapted for mounting on an aircraft and further showing the cargo carrier in its upper position within the interior of the aircraft.

Referring now to Figures 1 and 2 it will be seen that the cargo hoist mechanism of the present invention consists of a support or support frame 10 which, in the form here shown, may be secured to the fuselage 12 and cargo floor 14 of an airplane by attachment means such as pins 16 and release pins 18. Swinging lever means 20 may be pivotally mounted on the lower end of the support frame by such means as shaft 22. The lever means is rotated to its upper and lower positions by operation of rotation means such as an electric motor 24 although hydraulic motors, hand crank devices, or other actuating mechanisms could also be used. In the embodiment of Figures 1 and 2 the electric motor is controlled by a three position switch 26 connected by conduit 28 to a motor control box 30. Such a switch provides "up," "down" and "stop" buttons which permit accurate control with a minimum of effort.

Operation of the electric motor 24 actuates power transmission means here shown as a gear box 32 which in turn rotates a drum or pulley 34. Connecting means such as cables 33 thereby rotate a sector 35 which in turn is fixed to and rotates the lever 20.

A cargo carrier or platform 36 is pivotally connected to the other end of lever 20 by a shaft 38. The shaft may be mounted in the carrier or it may be supported by such means as bracket 40 which is secured to the underside of the carrier by another release pin 42. The carrier may conveniently be disengaged from the bracket by release pin 42 to thereby permit the guide prongs 43 to release from corresponding holes in the carrier. Other types of platforms may be mounted in a similar manner.

The position of the carrier may be held constantly parallel to any chosen reference plane, normally horizontal, by use of continuous connecting means such as one or more wires, chains, cords or cables 44 carried by pulleys 46, 48 and 50. Pulley 46 is fixed relative to the support 10 while pulleys 48 are freely pivotally mounted on lever 20. The latter pulleys merely aid in running the cable around the elbow in link 20 and could be eliminated in some forms of the mechanism. Pulley 50 is rigidly secured to the carrier 36 or its bracket 40. This of course creates a well known pulley and cable arrangement which maintains the plane of the carrier in the same angular position regardless of the angular position of the lever 20. The initial position of the carrier is determined simply by locating it in the desired plane prior to the time the cables are mounted or tightened to provide gripping contact with the various pulleys. For this purpose a quick disconnect 52 may be used to permit easy adjustment of the carrier's position by quickly releasing and applying tension loading to the cable. The cable also may be anchored to each of pulleys 46 and 50.

Figure 3 illustrates the hoist mechanism of Figures 1 and 2 in its stowed position. The stowing operation is carried out by raising the carrier to its upper position as shown in Figure 2. The release pin 42 is then disengaged and the carrier is lifted from the bracket. The pins 18 are released and the remainder of the mechanism is lifted upward, thereby disengaging pins 16 to permit the apparatus to be withdrawn into the aircraft for stowage.

The basic principles of the hoist mechanism can be embodied in various other forms, all within the scope of the present invention. Figures 4, 5 and 6 are illustrative of a few of the embodiments which are possible once the basic features are known. For instance, Figure 4 illustrates the application of hydraulic actuation by the use of means such as a hydraulically actuated push pull arrangement 53. In this form a hydraulic cylinder 54 is rotatably connected at one end to the hoist support 56 and its piston and connecting rod assembly 58 is similarly connected to a link 60. This force transmitting link is pinned at one end to the hoist support 56 and at the other end to a second link 62. The latter is in turn pivotally secured to a lever arm 64 which is secured to or integral with the platform swinging lever 66. When the push pull arrangement is actuated to elevate the platform 68 to the positions shown in Figure 5 the links gradually collapse to permit the movement while continuing to provide adequate leverage to enable the push pull arrangement to move the loaded platform. Again it is obvious that numerous equivalent force transmitting means may be substituted for the linkages shown and in some cases direct connection of the piston and connecting rod assembly 58 to lever 66 will suffice.

The embodiment of Figures 4 and 5 also employs another of many types of means suitable to rotate the platform in proportion to the rotation of the platform swinging lever 66. In this case a parallelogram linkage system is operated by various drum means as shown which are in turn actuated by continuous connecting means such as cables 70 and 72. A change in the angular position of the traversing link 66 causes rotation of a large drum 74 which is pivotally mounted on the link and rigidly connected to cross arm 80 as is best shown in Figure 6. This rotation serves to continuously adjust the cross arm so as to hold it parallel to a fixed reference plane. Drums 76 and 78 are pivotally mounted on the outermost portions of the cross arm 80 in such a manner that their rotation causes rotation of the connecting links 82 relative to the cross arm. These two drums are operated by continuous cable 72 which is actuated by drum 83 is rigidly secured to and rotates with drum 74 in the form here shown. The platform completes the parallelogram and is pivotally secured to the upper portions of the connecting links 82 in order to permit the movements shown in the solid and dotted line positions in Figure 5. Again it is apparent that gear trains, chain and sprocket mechanisms or other well known motion transmitting trains or linkages may be substituted without departing from the scope of the present invention. For instance drum 83 could be rigidly secured to link 66. In such a case the cable 72 would not need to be crossed to achieve the correct movements. In this form a rack and pinion arrangement could be used to provide for adidtional manual rotation of drum 83 when desired.

The embodiment of Figures 4, 5 and 6 also functions in a manner that enables the platform to be actually extended into the interior of the cargo container which is being loaded or unloaded. In this case this movement is achieved by taking advantage of the parallelogram linkage employed as is illustrated in dotted lines in Figure 5. The hoist support 56 is pivotally secured to the cargo floor by a pin 84 and bearing plate 86 in order that the hoist may be easily stowed. This operation is performed by elevating the platform to the dotted line or upper position shown in Figure 5 and then simply turning the entire hoist mechanism about the axis of the pin 84 until it is within the interior of the cargo container. The platform may be removed if desired in order to further conserve space.

Although the embodiments herein described are designed for use with a cargo or passenger type aircraft having a cargo opening in its side, it is apparent that the hoist may readily be adapted for use with other types of cargo vehicles. Other adaptations may require minor modifications such as the use of a series of swinging levers in order to handle large loads. Likewise multiple support frames, duplicate carrier positioning arrangements and additional actuating means may be utilized to increase the capacity of the hoist mechanism. The cables may be replaced by many types of equivalents such as chain and sprocket arrangements or any system which serves to transmit forces tending to properly position the carrier.

The embodiments shown here and the numerous equivalents can also be employed fixed to the cargo vehicle or it may be mounted on a stanchion in a loading zone or on any one of various types of material handling vehicles, since it is only necessary to position the pivot of the swinging lever at some suitable point between the planes of the upper and lower cargo levels involved. In these cases the support frame could actually be a part of the vehicle or other body to which the lever means is pivoted.

The now preferred embodiments of the present invention have been illustrated and described. However, it is to be understood that the invention need not be limited thereto for it is susceptible to changes in form, detail and application within the scope of the appended claims.

I claim:

1. A cargo loading and unloading mechanism for transferring cargo between the floor of an airplane cargo compartment and a lower cargo supporting surface, comprising: an elongate support frame mounted on said floor and bent in such a manner that it extends outwardly along said floor and downwardly from said compartment; an elongate swinging lever pivotally mounted at one end to the lower end of said frame for rotation in a vertical plane with respect to said frame, said lever being bent at its free end portion in a manner that positions said free end above said floor and within said cargo compartment when said mechanism is in its upward cargo transferring position; means for rotating said lever; a cargo platform; bracket means rigidly connected to the bottom of said platform and pivotally connected to the free end of said lever for rotation of said bracket means and platform in a vertical plane with respect to said lever; first drum means rigidly connected to said bracket means in a manner that places the axis of said first drum means in substantial alignment with the pivot axis of said bracket means; second drum means rigidly connected to said support frame in a manner that places the axis of said second drum means in substantial alignment with the pivot axis of said lever; and continuous connecting means carried by and operatively joining said drum means to retain them in constant angular relation.

2. A retractable cargo loading and unloading mechanism for transferring cargo between the floor of an airplane cargo compartment and a lower cargo supporting surface, comprising: support frame means detachably mounted to said airplane in the vicinity of said compartment and at least a portion of said frame means extending downwardly relative to said compartment; swinging lever means pivotally mounted at one end to the lower end of said frame means for rotation in a vertical plane with respect thereto, the lower portion of said lever means, when in the upward cargo transferring position, lying adjacent the downwardly extending portion of said frame means; means for rotating said lever means; a cargo platform; bracket means rigidly connected to the bottom of said platform and pivotally connected to the free end of said lever means for rotation of said bracket means and platform in a vertical plane with respect to said lever means; first drum means rigidly connected to said bracket means in a manner that substantially aligns the axis of said first drum means with the pivot axis of said bracket means; second drum means rigidly connected to said frame means in a manner that substantially aligns the axis of said second drum means with the pivot axis of said lever means; continuous connecting means carried by and operatively joining said drum means to retain them in constant angular relation; said mechanism in its upper cargo transferring position being readily retractable into said compartment by dismounting said frame means from said airplane and lifting the mechanism into said compartment.

3. A cargo transferring mechanism to accomplish transferral of cargo between an upper surface of a cargo supporting structure and a lower cargo supporting surface, comprising: a support frame, at least a portion of which depends downwardly relative to said upper surface; means for mounting said frame on said supporting structure in a fixed position; swinging lever means pivotally connected at one end portion to the lower end of said support frame for rotation in a vertical plane with respect thereto; means for rotating said lever means; a cargo platform; cross arm means pivotally connected to said swinging lever means at its opposite end portion; connecting link means pivotally joining said platform and said cross arm means in such a manner that the platform, cross arm means and link means constitute a parallelogram linkage system; first drum means rigidly connected to said support frame in a manner that places the axis of the first drum means in substantial alignment with the axis of rotation of said swinging lever means; second drum means rigidly connected to said cross arm means in a manner that places the axis of the second drum means in substantial alignment with the axis of rotation of said cross arm means; continuous connecting means carried by and operatively joining said first and second means; third drum means rigidly connected to said connecting link means in such a manner that the axes of said drum means are aligned with the pivot axes at the points where said connecting link means join said cross arm means; and continuous connecting means carried by and operatively joining said second and third drum means.

4. A cargo transferring mechanism to accomplish transferral of cargo between an upper surface of a cargo supporting structure and a lower cargo supporting surface, comprising: a support frame, at least a portion of which depends downwardly relative to said upper surface; means for mounting said frame on said supporting structure in a fixed position; swinging lever means pivotally connected at one end portion to the lower end of said support frame for rotation in a vertical plane with respect thereto, said lever means lying substantially adjacent the downwardly depending portion of said support frame when said mechanism is in its upper cargo transferring position; means for rotating said lever means; a cargo platform; cross arm means pivotally connected to said swinging lever means at its opposite end portion; connecting link means pivotally joining said platform and said cross arm means in such a manner that the platform, cross arm means and link means constitute a parallelogram linkage system; first drum means rigidly connected to said support frame in a manner that places the axis of the first drum means in substantial alignment with the axis of rotation of said swinging lever means; second drum means rigidly connected to said cross arm means in a manner that places the axis of the second drum means in substantial alignment with the axis of rotation of said cross arm means; continuous connecting means carried by and operatively joining said first and second means; third drum means rigidly connected to said connecting link means in such a manner that the axes of said drum means are aligned with the pivot axes at the points where said connecting link means join said cross arm means; and continuous connecting means carried by and operatively joining said second and third drum means.

5. A cargo loading and unloading mechanism for transferring cargo between the floor of a vehicle cargo compartment and a lower supporting surface, comprising: a support frame including a downwardly extending arm having an upper end attached near an edge of the cargo floor and a lower end having means engaging the vehicle and reacting thereagainst; lever means pivotally connected at one end to the lower end of the frame and swingable between upper and lower positions, said lever, in its upper position, including a portion lying approximately parallel with the frame arm and a second portion extending inwardly over the cargo compartment floor; means for moving said lever between upper and lower positions; pivoted cargo supporting means mounted on that portion of the lever positionable over the cargo floor; and means for maintaining the cargo supporting means in a constant attitude including a driven member fixedly mounted with respect to the cargo supporting member at the point about which said supporting member is pivoted, a driving member at the point of pivotal connection of the lever means to the lower end of the frame, and means interconnecting the driving and driven members.

6. A cargo loading and unloading mechanism for transferring cargo between the floor of a vehicle cargo compartment and a lower supporting surface, comprising; a support frame including an arm having an upper end maintained in a position at an edge of the floor, said arm extending downwardly a substantial portion of the distance between the floor and lower surface; lever means having an end thereof pivotally connected to the downwardly extending portion of the arm, said lever means being swingable between upper and lower positions and including first and second sections respectively lying approximately parallel with the frame arm and cargo floor when said lever is in the upward position; means for moving said lever between its respective positions; a cargo platen movably mounted on that lever section paralleling the floor; and means to maintain the platen in substantially the same attitude throughout the travel of the lever including a driven wheel for moving the cargo platen, a driving wheel on the support frame and flexible tension bearing means operatively interconnecting said driving and driven wheels.

References Cited in the file of this patent

UNITED STATES PATENTS

| | | |
|---|---|---|
| 561,822 | Shadbolt | June 9, 1896 |
| 800,841 | Burt | Oct. 3, 1905 |
| 818,053 | Rudkins | Apr. 17, 1906 |
| 2,301,579 | Plant et al. | Nov. 10, 1942 |
| 2,323,279 | Van Zelm | June 29, 1943 |
| 2,464,071 | Coffing | Mar. 8, 1949 |
| 2,646,902 | Nussberger | July 28, 1953 |
| 2,650,378 | Weinstein | Sept. 1, 1953 |
| 2,701,068 | Douglas et al. | Feb. 1, 1955 |

FOREIGN PATENTS

| | | |
|---|---|---|
| 101,792 | Sweden | June 10, 1941 |
| 113,348 | Australia | June 23, 1941 |
| 256,991 | Switzerland | May 4, 1946 |